(12) United States Patent
Gilges (10) Patent No.: US 10,876,473 B2
(45) Date of Patent: Dec. 29, 2020

(54) ACTUATOR, IN PARTICULAR FOR COUPLING TO THE ADJUSTING SHAFT OF AN INTERNAL COMBUSTION ENGINE TO ADJUST THE EXPANSION STROKE AND/OR THE COMPRESSION RATIO

(71) Applicant: OVALO GmbH, Limburg (DE)

(72) Inventor: Siegmar Gilges, Bad Schwalbach (DE)

(73) Assignee: OVALO GmbH, Limburg (DE)

( * ) Notice: Subject to any disclaimer, the term of this patent is extended or adjusted under 35 U.S.C. 154(b) by 231 days.

(21) Appl. No.: 15/750,213

(22) PCT Filed: Aug. 1, 2016

(86) PCT No.: PCT/EP2016/068330
§ 371 (c)(1),
(2) Date: Feb. 5, 2018

(87) PCT Pub. No.: WO2017/021369
PCT Pub. Date: Feb. 9, 2017

(65) Prior Publication Data
US 2018/0223729 A1 Aug. 9, 2018

(30) Foreign Application Priority Data

Aug. 3, 2015 (DE) ......................... 10 2015 112 688
Aug. 3, 2015 (LU) .......................................... 92788

(51) Int. Cl.
*F02B 75/04* (2006.01)
*F16H 57/025* (2012.01)
(Continued)

(52) U.S. Cl.
CPC ............ *F02B 75/04* (2013.01); *F16B 33/004* (2013.01); *F16H 57/025* (2013.01);
(Continued)

(58) Field of Classification Search
CPC combination set(s) only.
See application file for complete search history.

(56) References Cited

U.S. PATENT DOCUMENTS 9,797,307 B2 * 10/2017 Onigata ................. F02B 75/045
2010/0218745 A1 * 9/2010 Rabhi ................... F02B 75/048
123/48 B (Continued)

FOREIGN PATENT DOCUMENTS

DE           7630891 U1    3/1977
DE   20 2006 006 117 U1    8/2006
(Continued)

*Primary Examiner* — Kevin A Lathers
(74) *Attorney, Agent, or Firm* — Hodgson Russ LLP (57) ABSTRACT

The invention relates to an actuator which has a drive motor, a gearing positioned downstream of the drive motor in terms of drive and arranged coaxially with respect to the drive motor, and which has an output element. The actuator is characterized in that the entire actuator can be coupled as a fully assembled and functional structural unit to a system to be driven by means of the actuator, which system has a drive shaft, wherein a rotationally rigid connection of the output element to the drive shaft can be produced without the need for parts of the actuator to be dismounted for this purpose.

22 Claims, 6 Drawing Sheets

(51) Int. Cl.
F16B 33/00 (2006.01)
F16H 57/029 (2012.01)
F02D 15/02 (2006.01)
F16H 49/00 (2006.01)

(52) U.S. Cl.
CPC .......... F16H 57/029 (2013.01); F02D 15/02 (2013.01); F16H 49/001 (2013.01)

(56) References Cited

U.S. PATENT DOCUMENTS

| | | | |
|---|---|---|---|
| 2013/0055990 A1* | 3/2013 | Kamada | F02D 15/00 123/48 R |
| 2014/0224197 A1 | 8/2014 | Tadokoro et al. | |
| 2015/0033906 A1 | 2/2015 | Kimus et al. | |

FOREIGN PATENT DOCUMENTS

| | | |
|---|---|---|
| DE | 102008050826 A1 | 4/2010 |
| DE | 102010062047 A1 | 5/2012 |
| DE | 102011116952 A1 | 5/2013 |
| DE | 102011120162 A1 | 6/2013 |
| DE | 202014004439 U1 | 5/2015 |
| EP | 1450021 A1 | 8/2004 |
| EP | 2022959 A2 | 2/2009 |
| JP | H01-143448 U | 10/1989 |
| JP | H09250309 A | 9/1997 |
| JP | 2007-239520 A | 9/2007 |
| JP | 2010151088 A | 7/2010 |
| JP | 2015112920 A | 6/2015 |
| WO | 02/088605 A1 | 11/2002 |

* cited by examiner

ACTUATOR, IN PARTICULAR FOR COUPLING TO THE ADJUSTING SHAFT OF AN INTERNAL COMBUSTION ENGINE TO ADJUST THE EXPANSION STROKE AND/OR THE COMPRESSION RATIO

CROSS-REFERENCE TO RELATED APPLICATIONS

The present application is the U.S. national phase of International Application No. PCT/EP2016/068330 filed Aug. 1, 2016, which claims priority of Luxembourgian Application No. LU92788 filed Aug. 3, 2015 and German Application No. 102015112688.5 filed Aug. 3, 2015, the entire disclosures of which are incorporated herein by reference.

FIELD OF THE INVENTION

The invention relates to an actuator which has a drive motor, a gearing positioned downstream of the drive motor in terms of drive and arranged coaxially with respect to the drive motor, and which has an output element formed as an output shaft.

The invention also relates to an actuator system having an actuator of said type and having a sensor for measuring a rotational position and/or the number of rotations.

The invention also relates to a drive system having an actuator of said type, which is coupled to an internal combustion engine of the drive system for the purposes of varying the expansion stroke and/or the compression ratio of the internal combustion engine.

BACKGROUND OF THE INVENTION

US 2015/0033906 A1 has disclosed an actuating drive which is composed of a gearing and a drive motor. The actuating drive is constructed such that it is coupled successively, by individual components, to an internal combustion engine. Specifically, firstly the gearing alone, without the drive motor, is coupled to the internal combustion engine. In a further step, the drive motor is then mounted onto the already couple-on gearing. A fastening bolt by means of which the output shaft of the gearing is connected to the drive shaft of the system to be driven is then no longer accessible.

An actuating drive which is likewise designed to be coupled successively, by individual components, is known from DE 10 2011 116 952 A1. Said document discloses a multi-joint crank mechanism of an internal combustion engine having a multiplicity of coupling elements, which are mounted on crankpins of a crankshaft, and a multiplicity of articulation connecting rods, which are mounted rotatably on crankpins of an eccentric shaft, wherein each of the coupling elements is connected pivotably to a piston connecting rod of a piston of the internal combustion engine and to one of the articulation connecting rods, and the rotational angle position of the eccentric shaft is adjustable within a certain rotational angle range by means of an adjustment device. Here, it is provided that the eccentric shaft can be immobilized in at least one rotational angle blocking position by means of a blocking device. Specifically, it is proposed that the adjustment device has a gear mechanism with a drive wheel arranged rotationally conjointly on the eccentric shaft. In particular, the gearing is a worm gearing, wherein the output wheel is formed as a worm wheel.

EP 2 022 959 A1 has disclosed a device for the variable adjustment of the compression, which device has a multi-joint crank mechanism and in the case of which device an adjustment device for the rotational angle adjustment of an eccentric shaft comprises a lever arrangement. By means of the lever arrangement, the eccentric shaft can be rotated, and thus a desired rotational angle position can be set.

DE 10 2011 120 162 A1 discloses an internal combustion engine with variable compression. The internal combustion engine has a cylinder crankcase with a multiplicity of connecting rods which are mounted on a crankshaft and which bear a reciprocating piston. The crankshaft bearings are mounted eccentrically and are connected rotationally conjointly to one another. At least one toothed wheel segment is fastened to one of the axially outer crankshaft bearings, wherein the toothed wheel for introducing a torque acts on the toothed wheel segment for the purposes of adjusting the eccentric crankshaft bearings. Here, the toothed wheel engages into the toothed wheel segment perpendicularly to an axis of rotation crankshaft and at right angles to a cylinder axis of the cylinder crankcase.

DE 10 2010 062 047 A1 discloses a device for reducing the play in a gearing, in particular in a gearing for adjusting the compression ratio of an internal combustion engine with variable compression ratio.

EP 1 450 021 A1 discloses a reciprocating-piston engine with a variable compression ratio. The device also discloses an oil lubrication system. The engine is lubricated with oil by means of the oil lubrication system in a manner dependent on the compression ratio. The setting of the compression ratio and the control of the oil pressure performed by means of an electronic engine control unit.

The known devices are disadvantageously of highly complex construction. In particular, it is cumbersome to couple the actuators to an internal combustion engine.

SUMMARY OF THE INVENTION

It is therefore the object of the present invention to specify an actuator which can be mounted more easily.

The object is achieved by means of an actuator which is characterized in that the entire actuator can be coupled as a fully assembled and functional structural unit to a system to be driven by means of the actuator, which system has a drive shaft, wherein a rotationally rigid connection of the output element to the drive shaft can be produced without the need for parts of the actuator to be dismounted for this purpose, or without the need for parts of the actuator which are situated in the power flow from the drive motor to the output element to be dismounted for this purpose.

In particular, it may advantageously be provided that the rotationally rigid, coaxial connection of the output element to the drive shaft can be produced without the need for parts of the actuator to be dismounted for this purpose, or without the need for parts of the actuator which are situated in the power flow from the drive motor to the output element to be dismounted for this purpose.

The invention has the very particular advantage that the actuator can, as an independent structural unit which has been fully assembled and tested with regard to correct functionality by the manufacturer, be coupled by the user to a system to be driven. In particular, it is advantageously not necessary for the actuator to be disassembled for the coupling to a system to be driven, which firstly simplifies the mounting process itself and furthermore ensures that the actuator is used in the state in which it has been tested with regard to functionality, in particular immediately after its production.

As will be described in detail further below, the system to be driven by means of the actuator may for example be an internal combustion engine, in particular an internal combustion engine for a motor vehicle, wherein the actuator according to the invention may serve for adjusting the expansion stroke and/or the compression ratio of the internal combustion engine. The actuator according to the invention can advantageously be coupled to the internal combustion engine, and operatively connected to an adjustment shaft of the internal combustion engine, as an independent and fully functional structural unit without the need for the actuator to be disassembled beforehand, and/or mounted in the form of individual parts onto the internal combustion engine, by the technician performing the assembly of the drive system and/or of a motor vehicle having a drive system of said type.

In a particularly advantageous embodiment, the actuator has a fastening bolt for the fastening of the output element to a drive shaft to be driven by means of the actuator, which driveshaft may for example be the adjustment shaft of an internal combustion engine for the adjustment of the expansion stroke and/or the compression ratio. The fastening bolt may in particular have a metric thread, for example an M10 thread. The output element may in particular, as will be described in detail further below, be an output of the gearing, which is in particular of flexurally soft and simultaneously torsionally rigid form.

In particular, it may advantageously be provided that the fastening bolt runs both through the gearing and through the drive motor. Alternatively or in addition, the head of the fastening bolt and the output element may be arranged on opposite sides of the actuator. These embodiments have the particular advantage that the output element can be reliably fastened to a drive shaft of a system to be driven even if, in front of said output element, there are situated other elements of the gearing and/or of the drive motor which prevent direct access for the output element.

In one particular embodiment, the actuator has a fastening channel through which a fastening bolt for the fastening of the output element to a drive shaft to be driven by means of the actuator can be guided, and/or through which a tool for rotating the fastening bolt can be guided. In the case of such an embodiment, use may for example also be made of a fastening bolt which does not extend through the entire actuator in the mounted state. Rather, it is by all means also possible to use a relatively short fastening bolt, in particular a standard bolt. Such a fastening bolt can for example be operated using an adequately long tool, the free end of which is guided through the fastening channel to the fastening bolt during the coupling of the output element to the driveshaft of the system to be driven.

In a particular embodiment, the fastening channel is delimited by an in particular circular cylindrical sleeve. The sleeve may additionally also have the function of delimiting the fastening channel with respect to different spaces of the actuator, in particular with respect to a space which is flushed through with oil, as will be discussed in detail further below. In particular, the sleeve may provide one or more sealing surfaces which are in contact with seals, as will likewise be discussed in detail further below.

The sleeve may for example be arranged positionally fixedly relative to an actuator housing, and may in particular be directly connected to an actuator housing. Alternatively, it is for example also possible for the sleeve to be arranged positionally fixedly relative to the output element. Alternatively or in addition, it may also be provided that the sleeve is arranged coaxially with respect to the gearing and/or coaxially with respect to the drive motor.

In a particular embodiment, the sleeve runs both through the gearing and through the drive motor. In particular, it may advantageously be provided that the entrance opening of the fastening channel and the output element are arranged on opposite sides of the actuator.

In a particular embodiment, the fastening bolt is arranged coaxially and/or on the central axis of the actuator. Such an embodiment advantageously makes it possible for the components of the actuator, in particular the drive motor and the gearing, to be arranged coaxially with respect to one another, which altogether permits a compact structural form.

In a particular embodiment, the fastening bolt is designed and arranged so as to be connected rotationally conjointly to the output in the mounted state of the actuator on a system to be driven. Alternatively or in addition, the fastening bolt may advantageously be designed and arranged to be screwed, in particular at an end side, into a driveshaft to be driven.

For example, the fastening bolt may have a collar which is axially spaced apart from the head and which is designed and arranged to press the output element against the drive shaft to be driven, in particular the end side of the drive shaft to be driven.

In a very particularly advantageous embodiment, in the unmounted state of the actuator, the fastening bolt projects out of an actuator housing of the actuator, whereas, in the mounted state, that is to say when the actuator is connected to a system to be driven, said fastening bolt terminates flush with the actuator housing. In this way, the technician can visually check whether the connection of the actuator has been performed correctly.

Regardless of the coupling of the output element to the driveshaft of the system to be driven, it is for example possible for the actuator to have a fastening element or multiple fastening elements for the fastening to the system to be driven, for example to a housing of the system to be driven or to an engine block. The fastening element may for example have a fastening eyelet through which a bolt can be guided, and/or a flange.

In a very particularly advantageous embodiment, the fastening bolt is designed for the coupling of a sensor which measures the rotational position and/or the number of rotations of the fastening bolt relative to an actuator housing or relative to a component, which is fixed with respect to the actuator housing, of the actuator. The fastening bolt, which co-rotates with the output element, can in this way perform the additional function of transmitting the rotational movement of the output element and thus the rotational movement of the drive shaft of the driven system to a sensor. The sensor may in particular be coupled to the head of the fastening bolt. Such an embodiment makes it possible in particular for the center to be arranged outside and actuator housing of the actuator, in particular on the outer side of the actuator housing. A sensor arranged in this way is particular easily accessible for installation and/or repair work. In particular, it is also possible for the sensor to be attached after the actuator has been coupled to a system to be driven.

As an alternative to a fastening bolt, it may also be provided that the output element is connected rotationally conjointly to the drive shaft of the system to be driven, for example to an adjustment shaft internal combustion engine, by means of a plug-in connection. For example, the output element may have two eccentrically arranged bolts which engage into two end-side seats of the shaft to be driven.

However, such a solution is critical insofar as the output element and the drive shaft to be driven can have axial play relative to one another.

As already mentioned, the actuator may advantageously have an actuator housing. The actuator housing may have an entrance opening. It may advantageously be provided that the fastening bolt, in particular the head of the fastening bolt, and/or some other fastening means, in particular some other bold, and/or the fastening channel, are accessible through the entrance opening. The entrance opening may alternatively or additionally be designed to provide access for maintenance or servicing work.

The entrance opening can be closed off by means of a removable cover, which may be formed for example as a closure plug or as a removable cap. The cover is not a part of the actuator that is situated in the power flow from the drive motor to the output element. The cover may in particular also serve for covering parts that are situated in the power flow from the drive motor to the output element.

As an alternative or in addition to a cover, the actuator housing may have further actuator housing parts which are in particular removable without being destroyed and/or without the use of tools and which are not situated in the power flow from the drive motor to the output element. Said actuator housing parts may for example have the function of enclosing operating media, such as for example oil (in particular in interaction with at least one other actuator housing part) or protecting other actuator parts against contamination.

As a further component which is not situated power flow from the drive motor to the output element, the actuator may for example have an electronic component, a circuit board with electronic components, a plug connector or a component which is equipped with an electronic circuit board or a sensor arrangement. It is however not ruled out that such components are also arranged in the power flow in particular embodiments.

As already mentioned, the actuator may in particular be coupled to an adjustment shaft of the internal combustion engine, the rotational position of which adjustment shaft determines the expansion stroke and/or the compression ratio of the internal combustion engine. For the control of the internal combustion engine, it is necessary for the respectively present setting of the expansion stroke and/or of the compression ratio to be continuously measured and monitored. For this purpose, the internal combustion engine normally comprises a dedicated sensor which continuously measures the rotational position of the adjustment shaft. By means of the above-described coupling of a sensor to the actuator that measures the rotational position and/or the number of rotations of the fastening bolt relative to an actuator housing or relative to the component, which is fixed to an actuator housing, of the actuator, it is advantageously possible—in accordance with an independent concept of the invention—to omit a dedicated sensor that is arranged in the internal combustion engine. It is rather possible for the rotational position and/or the number of rotations of the adjustment shaft to be reliably measured and monitored by means of the sensor coupled to the fastening bolt. In this respect, it may advantageously be provided, in a drive system which has an internal combustion engine, and actuator according to the invention and a sensor coupled to the fastening bolt, that the internal combustion engine has no sensor for measuring the rotational position of the adjustment shaft, and/or that a control device determines the respectively present setting of the expansion stroke and/or of the compression ratio of the internal combustion engine exclusively by means of the sensor coupled to the fastening bolt.

It would duly also be possible for the rotational position of the output element and thus of the adjustment shaft of the internal combustion engine to be measured indirectly by detecting the rotations of the drive motor by means of a rotational speed sensor and inferring the angular position of the output element using the transmission ratio of the gearing. This would however not be sufficiently reliable in practice, because a value is returned even when the drive motor is duly functioning but, for example owing to a defect, no torque is transmitted to the output element and/or to the adjustment shaft of the internal combustion engine. This problem does not arise if the rotational position and/or the number of rotations of the fastening bolt are measured directly.

In a very particularly advantageous embodiment, the actuator has two spaces which are sealed off relative to one another, wherein it may be provided in particular that the gearing is arranged in one of the spaces, and the drive motor or at least parts of the drive motor, or a rotational speed sensor which measures the rotational position and/or the number of rotations of the output shaft of the drive motor, is arranged in the other of the spaces. The rotational speed sensor may in particular be provided in addition to the abovementioned sensor which measures the rotational position and/or the number of rotations of the fastening bolt.

The actuator may have two spaces which are sealed off relative to one another, one of which is designed and arranged to be connected to an oil lubrication system, in particular an oil lubrication of the system to be driven. In particular, the gearing or at least parts of the gearing may be arranged in said space, which has the advantage that sufficient lubrication of the gearing is ensured.

For example, if the system to be driven is formed as an internal combustion engine, there is the problem that the pressurized engine oil or the dirt and abraded particles transported therein, which in the case of a passenger motor vehicle engine may have a pressure of up to 5 bar, could also pass into regions of the actuator where it can cause damage. Such regions include in particular the actuator electronics and that region of the rotational speed sensor which detects the number of rotations of the output shaft of the drive motor and/or the angular position of the output shaft of the drive motor. For this reason, provision may advantageously be made for said regions to be protected by means of seals, wherein at least one seal may be arranged in particular also in the region of the fastening bolt, as will be discussed below.

In a particular embodiment, the actuator has two spaces which are sealed off relative to one another, wherein one of the spaces is filled with a gas, in particular with air. In said space there may be situated in particular electronic components, such as for example a rotational speed sensor, which measures the rotational position and/or the number of rotations of the output shaft of the drive motor. In particular, provision may also be made for the drive motor or at least parts of the drive motor to be situated in said space. As described above, the other of the two spaces may advantageously contain the gearing or parts of the gearing and/or be connected to an oil lubrication system.

For example if the actuator is constructed such that the drive motor is situated in one of the spaces and the gearing which is positioned downstream in terms of drive is situated in the other space, in which oil is present, it is necessary for the spaces to be sealed off relative to one another in the region of the output shaft of the drive motor and/or in the region of the drive shaft of the gearing. Here, allowance must be made for the fact that the seal must be arranged between components which move at high speed relative to one another during operation. Thus, in a particular embodiment, the spaces are sealed off relative to one another by means of at least one seal which is formed as a non-contact seal and/or as a dynamic seal and/or as a rotary seal and/or as a gap seal and/or as a seal which utilizes a centrifugal effect for sealing purposes and/or as a labyrinth seal. It is ensured in this way that the seal has an adequately long service life despite the relative movement.

In particular, it may advantageously be provided that the seal, at one side, bears against the fastening bolt and/or interacts with the fastening bolt and, at the other side, bears against the inner side of a hollow shaft and/or interacts with a hollow shaft. The hollow shaft may in particular be the drive shaft of the gearing and/or the output shaft of the drive motor. It is alternatively also possible for the hollow shaft to be connected rotationally conjointly to a drive shaft of the gearing or to an output shaft of the drive motor. The seal may in particular bear against the inner side of a hollow shaft and/or interact with a hollow shaft, which is connected rotationally conjointly to a wave generator of the gearing, which is formed as a strain wave gearing.

To be able to mount a ring-shaped seal, the fastening bolt may have a diameter thickening in the seal region, wherein the diameter there is greater than or equal to the diameter of the head of the fastening bolt. In this way, the fastening bolt can be mounted together with the seal during the assembly of drive motor and gearing; specifically, it is possible in particular for the head of the fastening bolt to be inserted through the seal. It would alternatively be possible to use a multi-part seal, for example a seal that can be assembled from two half segments.

The use of a hollow shaft has the particular advantage that the fastening bolt, in particular the shank of the fastening bolt, can run through the interior of the hollow shaft.

As already mentioned, it may advantageously be provided that the actuator provides a fastening channel which is delimited, in particular radially, by a sleeve. In the case of such an embodiment, too, it is possible for the actuator, as described above, to have two spaces which are sealed off relative to one another. For the sealing of the spaces relative to one another, at least one seal may be provided which bears against the sleeve, in particular against the outer side or the end side of the sleeve, and/or interacts with the sleeve. If a seal is arranged at one side between the output shaft of the drive motor and/or the drive shaft of the gearing and the sleeve at the other side, allowance must be made for the fact that the seal is arranged between components which move at high speed relative to one another during operation. In this respect, use should advantageously be made of a seal which is formed as a non-contact seal and/or as a dynamic seal and/or as a rotary seal and/or as a gap seal and/or as a seal which utilizes a centrifugal effect for sealing purposes and/or as a labyrinth seal. It is ensured in this way that the seal has an adequately long service life despite the relative movement. It is ensured in this way that the seal has an adequately long service life despite the relative movement.

Independently of the above-described seal which seals off the different spaces of the actuator relative to one another, it is advantageously possible for a housing seal to be provided which seals off the actuator housing, in particular the gas-filled space of the actuator housing, relative to the space surrounding the actuator. In this way, it is advantageously the case, for example, that dirt is prevented from ingressing into the gas-filled space of the actuator. In particular, the housing seal can, at one side, bear against actuator housing of the actuator and/or interact with an actuator housing of the actuator and, at the other side, bear against the fastening bolt, in particular against the head of the fastening bolt, and/or interact with the fastening bolt, in particular with the head of the fastening bolt.

For example, a housing seal may be provided in the region of the head of the fastening bolt, which housing seal imparts a sealing action between the head and the actuator housing. Here, use is advantageously made of the fact that the head of the fastening bolt performs only small and slow rotational angles relative to the actuator housing. Therefore, it is in particular also possible for a contact seal to be used here.

In a particularly advantageous embodiment, the fastening bolt, in particular in the region of the shank and/or in the region of the head, provides at least one seal surface for the seal and/or the housing seal. The fastening bolt preferably has no thread in the region of the seal surface. In this respect, the fastening bolt—according to an independent concept of the invention—performs not only the function of permitting coupling of the output element to the adjustment shaft of the internal combustion engine but also the function of being a part of the seal system or of multiple seal systems.

According to a very particular independent concept of the invention, which can also be implemented independently of the feature whereby the entire actuator can be coupled as a fully assembled and functional structural unit to a system to be driven by means of the actuator, which system has a drive shaft, wherein a rotationally rigid connection of the output element to the drive shaft can be produced without the need for parts of the actuator to be dismounted for this purpose, or without the need for parts of the actuator which are situated in the power flow from the drive motor to the output element to be dismounted for this purpose, the fastening bolt may advantageously be designed and arranged such that it cannot be removed without parts of the actuator being dismounted or destroyed for this purpose. This is in particular the case even when the actuator has not yet been coupled to a system to be driven. This prevents the fastening bolt from being inadvertently lost, for example during transport from the manufacturer of the actuator to a user that couples the actuator to an internal combustion engine. In particular, according to an independent concept of the invention, it may advantageously be provided that the fastening bolt is designed and arranged such that it cannot be removed without parts of the actuator which are situated in the power flow from the drive motor to the output element being dismounted or destroyed for this purpose, if the actuator is not coupled to a system to be driven. This is in particular the case even when the actuator has not yet been coupled to a system to be driven.

The captively retained arrangement of the fastening bolt may be realized for example by means of a collar which delimits the axial mobility of the fastening bolt. For example, it may advantageously be provided that, when the fastening bolt running through a hollow shaft is displaced in the direction of the drive motor, said collar abuts against a constriction of the hollow shaft—and, when said fastening bolt is displaced in the opposite direction, said collar abuts against the output element. The collar may in particular be the collar already mentioned above, which is designed and arranged to press the output element against the drive shaft to be driven, in particular the end side of the drive shaft to be driven.

The collar may be produced in one piece together with the fastening bolt or at least with the shank of the fastening bolt.

It is however also possible for the collar to be attached as an independently produced component, for example as a clip or disk, in particular non-detachably to the fastening bolt.

The gearing may advantageously be formed as a strain wave gearing. In particular, the gearing may advantageously be formed as a strain wave gearing in the form of a ring gearing. In particular, it may advantageously be provided that the output element has an internally toothed ring gear.

It is however also possible for the gearing to be of some other gearing type. For example, the gearing may also be formed as a planetary gearing.

It has however been identified that the forces and torques that arise during the coupling of an actuator to a coupling end of a shaft to be driven, which coupling end performs oscillating movements in a radial and/or axial direction, for example tumbling movements, have a particularly disadvantageous effect the greater the play of the gearing is. It has therefore furthermore been identified that the basic use of a strain wave gearing, which by its nature is free from play, for applications which also include the coupling to an adjustment shaft of an internal combustion engine for the purposes of adjusting the expansion stroke and/or the compression ratio, is particularly advantageous.

A strain wave gearing is normally constructed so as to have a rigid, circular and internally toothed ring gear, which is referred to as circular spline, and a radially flexible, externally toothed gearwheel which is arranged in the interior of the rigid, internally toothed ring gear and which is referred to as flex spline. In the externally toothed gearwheel, a normally elliptical wave generator is arranged rotatably by means of a rolling bearing, which wave generator deforms the radially flexible, externally toothed gearwheel into an elliptical shape so as to cause the toothings of the internally toothed gearwheel and of the radially flexible, externally toothed gearwheel to engage with one another at each end of the ellipse primary axis.

In particular, as a gearing, use may advantageously be made of a strain wave gearing with a wave generator, with an externally toothed flex spline and with an internally toothed ring gear which is in meshing engagement with the flex spline. In particular, it may advantageously be provided that, for transmitting a torque to a shaft to be driven, the coupling end of which shaft performs axial and/or radial movement in an externally driven manner, the strain wave gearing comprises an output element which has the ring gear, which output element is of torsionally rigid and flexurally soft form and at least partially, in particular fully, decouples the other parts of the actuator from the externally driven axial and/or radial movement. In particular, the output element may advantageously have a torsionally rigid and simultaneously flexurally soft output bell housing.

In addition to the freedom from play that substantially protects the strain wave gearing itself from damage, it is in particular the case that the preferably flexurally soft and torsionally rigid, pot-shaped output bell housing of the output element protects the other parts of the actuator permanently against damage as a result of radial and/or axial oscillating movements, in particular tumbling movements, of the coupling end of the shaft to which the actuator is coupled.

The output element of the gearing may advantageously be an output shaft which is designed and arranged to transmit a rotational movement to the drive shaft of the system to be driven in the coupled state of the actuator. In particular, it may advantageously be provided that the output shaft is fastened by means of the fastening bolt to the shaft to be driven of the system to be driven by means of the actuator.

For this purpose, the output shaft may have and in particular coaxial and/or central passage bore through which the fastening bolt runs, wherein it may be provided in particular that the output shaft is clamped between a collar of the fastening bolt and the shaft to be driven.

The ring gear is preferably mounted so as to be rotatable, but positionally fixed, relative to a housing and/or the axis of symmetry of the strain wave gearing by means of a ring gear bearing arrangement.

In the context of the present invention, the expression "output bell housing" is to be understood to mean a component which is suitable and arranged for transmitting a torque from the ring gear to an output shaft of the gearing, wherein the output bell housing need not necessarily be in the shape of a classic bell, such as for example a church bell. For example, it may also be of pot-shaped and/or asymmetrical form. The output bell housing need not necessarily be of rotationally symmetrical form. For example, the output bell housing may also have multiple, at least partially radially arranged spokes. In particular, the output bell housing need not necessarily have a closed wall. However, a rotationally symmetrical design of the output bell housing, in particular in the shape of a pot or with a classic bell shape, is particularly advantageous because, with such a design, an imbalance is avoided, and the radial and/or axial forces that have to be accommodated always give rise to the same deformation regardless of the rotational position.

By means of the flexurally soft and torsionally rigid output element, which may for example comprise a preferably flexurally soft and torsionally rigid pot-shaped output bell housing, in combination with the positionally fixed bearing arrangement of the ring gear, the flex spline and the wave generator and/or a dynamic spline and/or a ring gear bearing arrangement are at least substantially decoupled from the radial and/or axial movements, in particular tumbling movements, performed by the drive shaft of the coupled system, in particular an adjustment shaft for the adjustment of the expansion stroke and/or the compression ratio, without the ability for a torque to be transmitted from the strain wave gearing to the drive shaft in a play-free manner being adversely affected. The ring gear bearing arrangement, which may be formed in particular as a plain bearing, therefore has to accommodate at most a small residual component of the radial and/or axial movements, in particular tumbling movements.

In a very particularly advantageous embodiment, an output component of the drive motor and a drive component of the gearing are formed as separately produced components, which are connected rotationally conjointly to one another. It may particularly advantageously be provided that the output component of the drive motor and the drive component of the gearing are connected rotationally conjointly to one another by means of at least one clamping component. The clamping component may be formed for example as a corrugated and/or elastic and/or cylindrically curved strip, in particular sheet-metal strip, and/or as a slotted ring and/or as a slotted cylindrical spring tube. Such an embodiment has the very particular advantage that the drive motor and the gearing can be produced separately from one another, in particular on different manufacturing lines, which makes the manufacturing process of the actuator altogether more efficient. For example, a drive component of the gearing, in particular the wave generator, may have a recess into which the output component of the drive motor, specifically an output shaft, and the clamping component can be inserted, and thus connected to one another in frictionally engaging fashion. An embodiment in which multiple clamping components are connected mechanically in parallel for the rotationally rigid coupling of the output shaft of the drive has a particularly good clamping action, with which slippage is reliably prevented and which is nevertheless easy to assemble.

As already mentioned, a drive system, in particular for a motor vehicle and/or a passenger motor vehicle, is particularly advantageous which has an internal combustion engine and an actuator according to the invention, which actuator is coupled to the internal combustion engine and serves for varying the expansion stroke and/or the compression ratio of the internal combustion engine. Here, it may advantageously be provided that the internal combustion engine has an adjustment shaft, wherein the expansion stroke and/or the compression ratio of the internal combustion engine can be varied through variation of the rotational position of the adjustment shaft, and wherein the output element is connected rotationally conjointly to the adjustment shaft and/or is arranged coaxially with respect to the adjustment shaft. As has likewise already been mentioned, it may advantageously be provided that the internal combustion engine has no sensor for measuring the rotational position of the adjustment shaft, and/or that a control device determines the respectively present setting of the expansion stroke and/or of the compression ratio of the internal combustion engine exclusively by means of a sensor coupled directly to the actuator. Furthermore, the actuator may advantageously be at least partially connected to the oil supply system of the internal combustion engine.

What is very particularly advantageous as a motor vehicle which comprises an actuator according to the invention and/or a drive system according to the invention.

BRIEF DESCRIPTION OF THE DRAWING VIEWS

The subject matter of the invention is illustrated by way of example and schematically in the drawing, and will be described below on the basis of the figures, wherein identical elements or elements of identical action are normally denoted by the same reference designations. In the drawing.

DETAILED DESCRIPTION OF THE INVENTION

Figure 1:
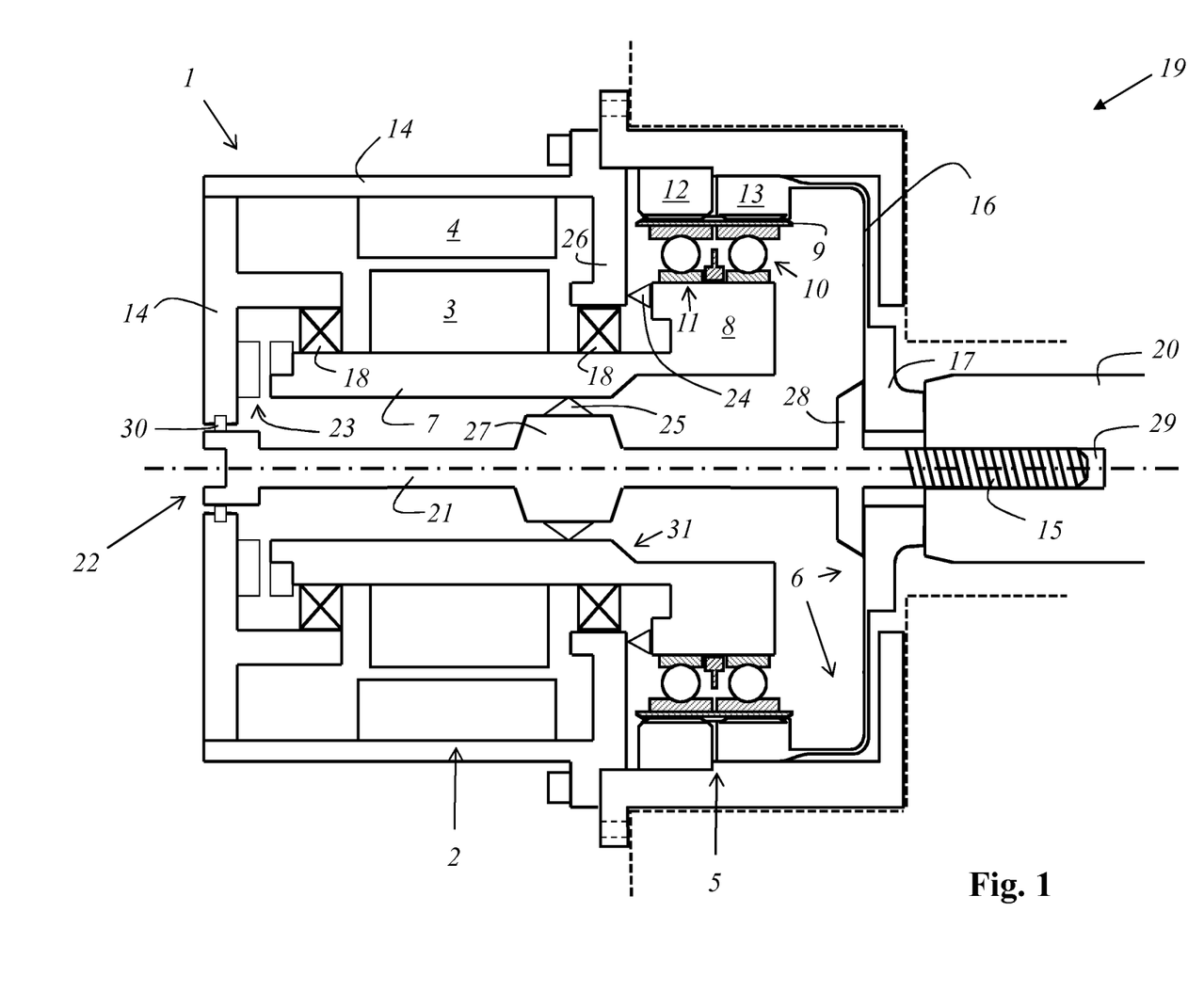
FIG. 1 shows a first exemplary embodiment of an actuator according to the invention.

FIG. 1 shows a first exemplary embodiment of an actuator 1 according to the invention, which comprises a drive motor 2 with a rotor 3 and with a stator 4. Furthermore, the actuator 1 comprises a gearing 5 which is positioned downstream of the drive motor 2 in terms of drive and which is arranged coaxially with respect to the drive motor 2 and which has an output element 6. The rotor 3 is connected rotationally conjointly to a hollow shaft 7, which functions as output shaft of the drive motor 2 and which drives a wave generator 8 of the gearing 5 formed as a strain wave gearing and which is connected integrally to said wave generator. The hollow shaft 7 is mounted rotatably by means of two rolling bearings 18.

The strain wave gearing has an externally toothed, ring-shaped flex spline 9. The wave generator 8 is mounted rotatably in the ring-shaped flex spline 9 by means of two rolling bearings 10, 11, and deforms these into an oval shape such that the flex spline 8 engages with its external toothing both into the internal toothing of a first ring gear, specifically of a dynamic spline 12, and into the internal toothing of a second ring gear, specifically of a circular spline 13. The dynamic spline 12 is fastened rotationally fixedly in an actuator housing 14.

The strain wave gearing has an output element 6, which has the circular spline 13 and a pot-shaped output bell housing 16, which is connected rotationally conjointly to said circular spline 13, and an output shaft 17. The output bell housing 16 is produced in one piece together with the circular spline 13 and the output shaft 17. The output bell housing 16 is of flexurally soft and simultaneously torsionally rigid form.

The entire actuator 1 can be coupled as a fully assembled and functional structural unit to a system 19 to be driven by means of the actuator 1, which system has a drive shaft 20, wherein a rotationally rigid connection of the output element 6 to the drive shaft 20 can be produced without parts of the actuator having to be dismounted for this purpose. The drive shaft 20 may for example be an adjustment shaft for the adjustment of the expansion stroke and/or of the compression ratio of an internal combustion engine.

The actuator has a fastening bolt 21 for the fastening of the output element 6 to the drive shaft 20 to be driven by means of the actuator 1. The fastening bolt 21 is a thread 15 and is screwed at the end side into a threaded bore 29 of the drive shaft 20, whereby the output shaft 17 of the output element 6 is clamped between a collar 28 and the end side of the drive shaft 20.

The fastening bolt 21 is arranged centrally and coaxially both with respect to the gearing 5 and with respect to the drive motor 2 and runs both through the gearing 5 and through the drive motor 2. The head 22 of the fastening bolt 21 and the output element 6 are arranged on opposite sides of the actuator.

The actuator 1 has two spaces which are sealed off relative to one another, wherein the gearing 5 is arranged in one of the spaces and the drive motor 2, and a rotational speed sensor 23 which measures the rotational position and/or the number of rotations of the hollow shaft 7 of the drive motor 2, is arranged in the other of the spaces. That space of the actuator 1 in which the gearing 5 is arranged is designed and arranged to be connected to an oil lubrication system, in particular an oil lubrication system of the system 19 to be driven. The space in which the gearing 5 is arranged is sealed off, by means of a first seal 24 and by means of a second seal 25, relative to the space in which the drive motor 2 and a rotational speed sensor 23 are arranged. The seals are formed as non-contact seals in order to allow for the fact that they are in each case in contact with components which move at high speed relative to one another. The first seal 24 is situated spatially between the wave generator 8 and a partition 26.

The second seal 25 bears at one side against the fastening bolt 21 and at the other side against the inner side of the hollow shaft 7. In the region of the second seal 25, the fastening bolt 21 has a diameter thickening 27, such that the second seal 25 may have an inner diameter of such a size that the head 22 of the fastening bolt 21 can be inserted through the second seal 25 during the assembly of the actuator 1.

Independently of the seals 24, 25 described above, which seal off the different spaces of the actuator relative to one another, a housing seal 30 is provided which seals off the actuator housing 14 relative to the space surrounding the actuator 1. The housing seal 30 bears at one side against actuator housing 14 and at the other side against the head 22 of the fastening bolt 21. Here, use is advantageously made of the fact that the head 22 of the fastening bolt 21 performs only small and slow rotational angle movements relative to the actuator housing 14. Therefore, as a housing seal 30, use may in particular also be made of a contact seal.

The fastening bolt 21 is designed, and arranged in the actuator 1, such that it cannot be removed from the actuator 1 without parts of the actuator 1 being dismounted or destroyed for this purpose. This is in particular also the case when the actuator 1 has not yet been coupled to a system 19 to be driven. The captively retained arrangement of the fastening bolt 21 is realized in particular by means of the collar 28, which limits the axial mobility of the fastening bolt 21. When the actuator 1 has not yet been coupled to a system 19 to be driven, when the fastening bolt 21 is displaced in the direction of the drive motor 2, the collar 28 abuts against a constriction 31 of the hollow shaft 7, whereas, when said fastening bolt is displaced in the opposite direction, said collar abuts against the output element 6.

Figure 2:
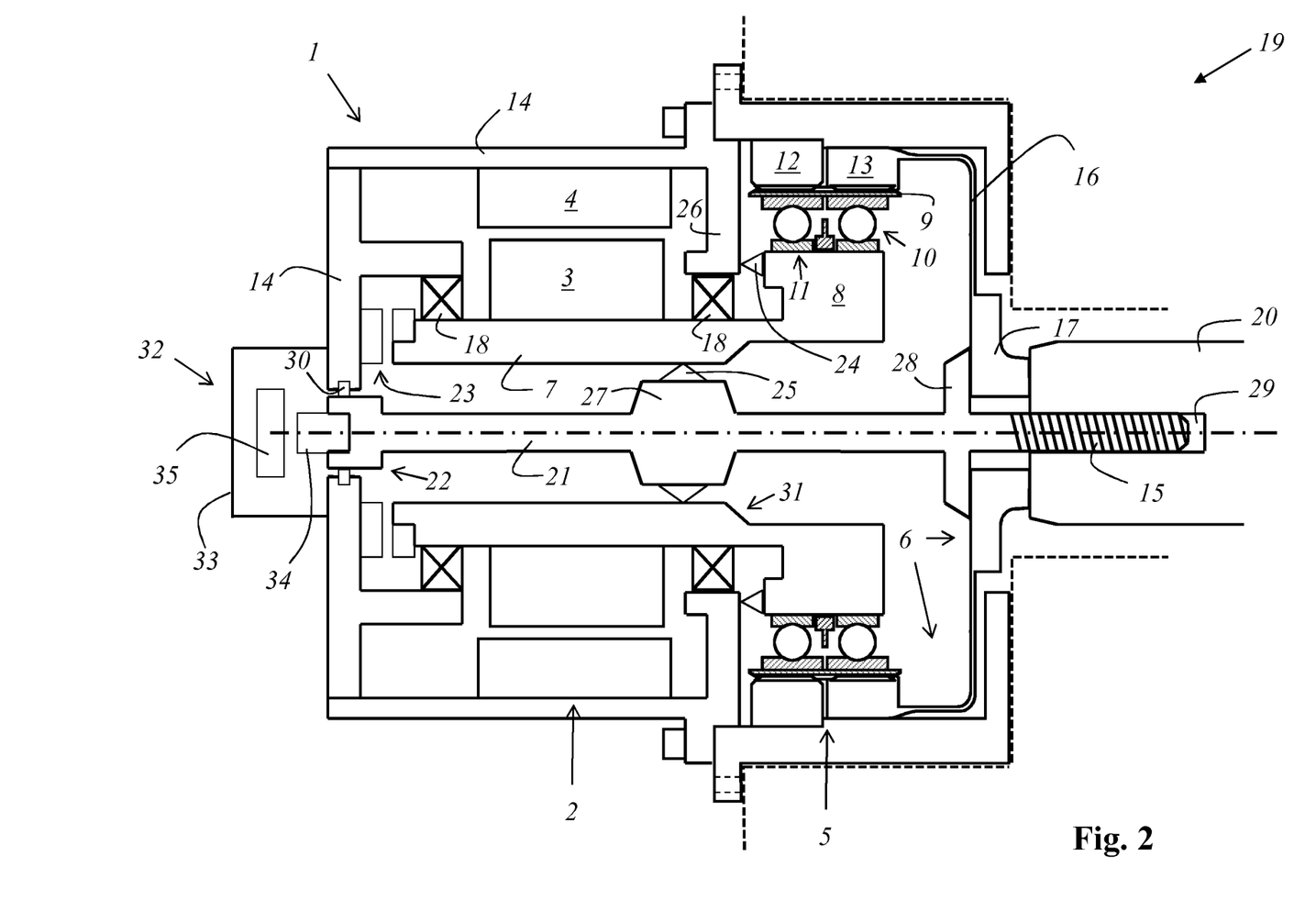
FIG. 2 shows an exemplary embodiment of an actuator system according to the invention having an actuator with a sensor.

FIG. 2 shows an exemplary embodiment of an actuator system according to the invention having an actuator 1 as illustrated in FIG. 1 and having a sensor 32 which measures the rotational position and/or the number of rotations of the fastening bolt 21 relative to the actuator housing 14. The sensor 32 is coupled to the head 22 of the fastening bolt 21, and the housing 33 thereof is fastened to the actuator housing 14. In particular, a magnetic encoder element 34 may be fastened to the head 22, the rotational position of which encoder element is detected by a detector element 35 of the sensor 32. The fastening bolt 21 that co-rotates with the output element 6 thereby performs the additional function of transmitting the rotational movement of the output element 6 and thus the rotational movement of the output shaft 20 of the driven system 19 to the sensor 32.

Figure 3:
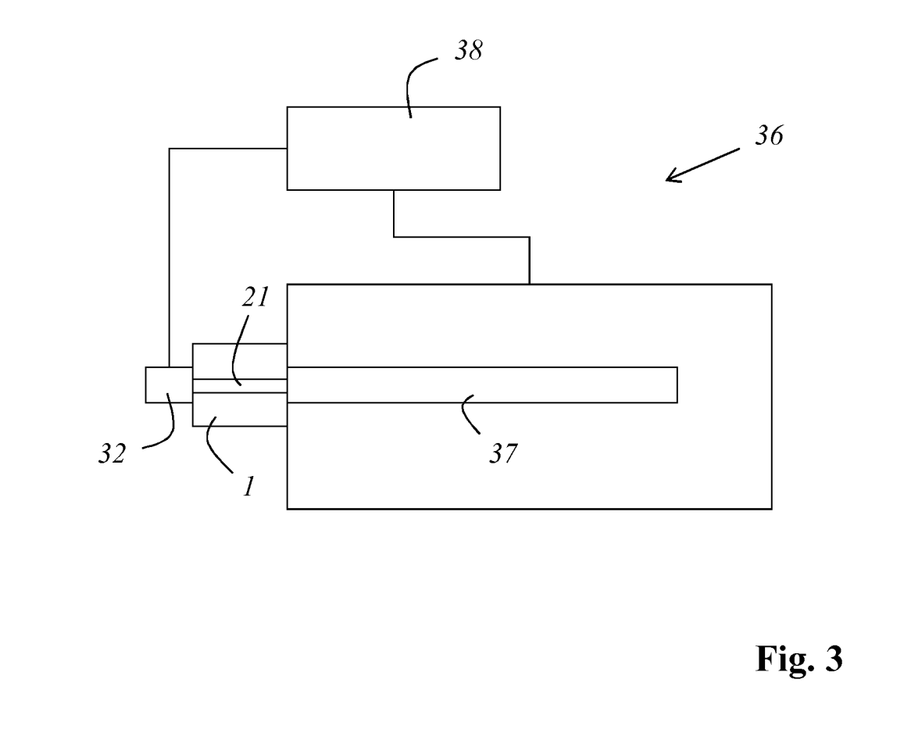
FIG. 3 shows an exemplary embodiment of a drive system according to the invention.

FIG. 3 schematically shows an exemplary embodiment of a drive system according to the invention, in particular for a motor vehicle and/or a passenger motor vehicle, which drive system has an internal combustion engine 36 and an actuator 1 according to the invention which is coupled to the internal combustion engine 36 and which serves for varying the expansion stroke and/or the compression ratio of the internal combustion engine 36.

On the fastening bolt 21 there is arranged a sensor 32 which measures the rotational position and/or the number of rotations of the fastening bolt 21, and thus of a coupled adjustment shaft 37, relative to the actuator housing 14 and which transmits the measurement value to an electronic control device 38. The control device 38 controls further settings of the internal combustion engine, such as for example the ignition time and/or the camshaft setting, take into consideration the transmitted measurement value. The fastening bolt 21 that co-rotates with the adjustment shaft 37 performs additional function of transmitting the rotational movement of the output element and thus the rotational movement of the adjustment shaft to the sensor 32.

By means of the above-described coupling of the sensor 32 to the actuator 1, which measures the rotational position and/or the number of rotations of the fastening bolt 21 relative to the actuator housing 14, it is advantageously possible to omit a dedicated sensor that is arranged in the internal combustion engine 36. In this respect, it may advantageously be provided that the internal combustion engine 36 has no dedicated sensor for measuring the rotational position of the adjustment shaft 37, and that the control device 38 determines the respectively present setting of the expansion stroke and/or of the compression ratio of the internal combustion engine 36 exclusively by means of the sensor coupled to the fastening bolt 21.

Figure 4:
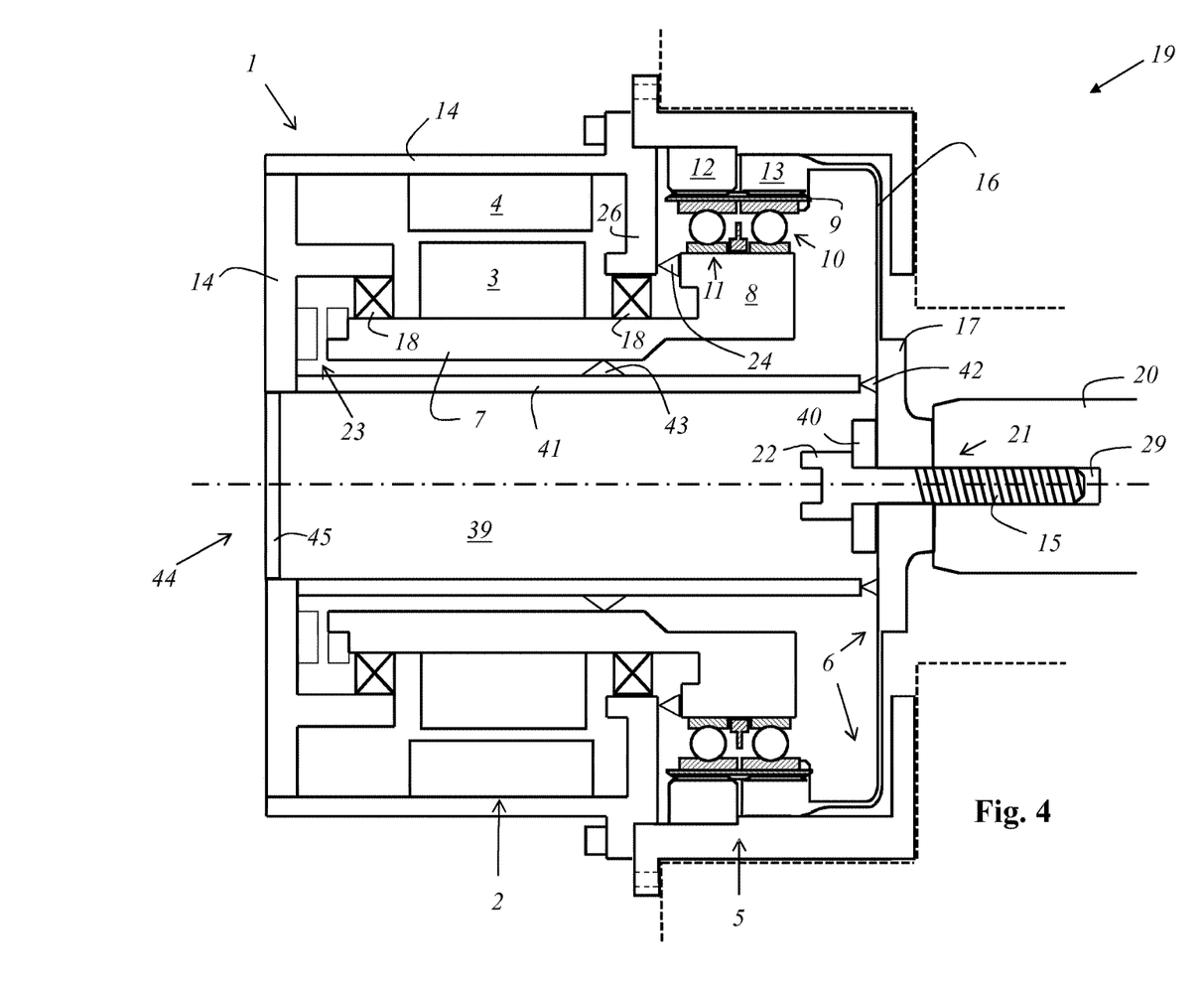
FIG. 4 shows a second exemplary embodiment of an actuator according to the invention.

FIG. 4 shows a second exemplary embodiment of an actuator 1 according to the invention. In this exemplary embodiment, the actuator 1 has a fastening channel 39 through which a fastening bolt 21 can be guided to the output element 6. Furthermore, a tool for rotating the fastening bolt 21 can be inserted through the fastening channel 39. In this embodiment, the fastening bolt 21 does not extend through the entire actuator 1 in the mounted state. Rather, the fastening bolt 21 is designed to be shorter than the fastening bolt 21 of the first exemplary embodiment illustrated in FIG. 1. In particular, the fastening bolt 21 may be formed as a standard bolt. And in particular standardized washer 40 is arranged between the head 22 of the fastening bolt 21 and the output shaft 17.

The fastening bolt 21 can be operated using an adequately long tool, the free end of which is guided through the fastening channel 39 to the head 22 of the fastening bolt 21 during the coupling of the output element 6 to the drive shaft 20 of the system 19 to be driven.

The fastening channel 39 is delimited by a circular cylindrical sleeve 41. The sleeve additionally also has the function of delimiting the fastening channel 39 relative to different spaces of the actuator 1. The sleeve 41 provides in each case one sealing surface on the outer side and on the end side. A first seal 42 bears against the face-side sealing surface, which first seal is furthermore in contact with the output element 6. A second seal 43 bears against the outer sealing surface, which second seal is furthermore in contact with the hollow shaft 7 and is preferably formed as a non-contact seal.

The sleeve 41 is arranged so as to be positionally fixed relative to an actuator housing 14, and is connected directly to the actuator housing 14. The sleeve 41 runs both through the gearing 5 and through the drive motor 2, wherein the entrance opening 44 of the fastening channel 39 and the output element 6 are arranged on opposite sides of the actuator 1. The entrance opening 44 of the fastening channel 39 is closed off by means of a removable cover 45.

Figure 5:
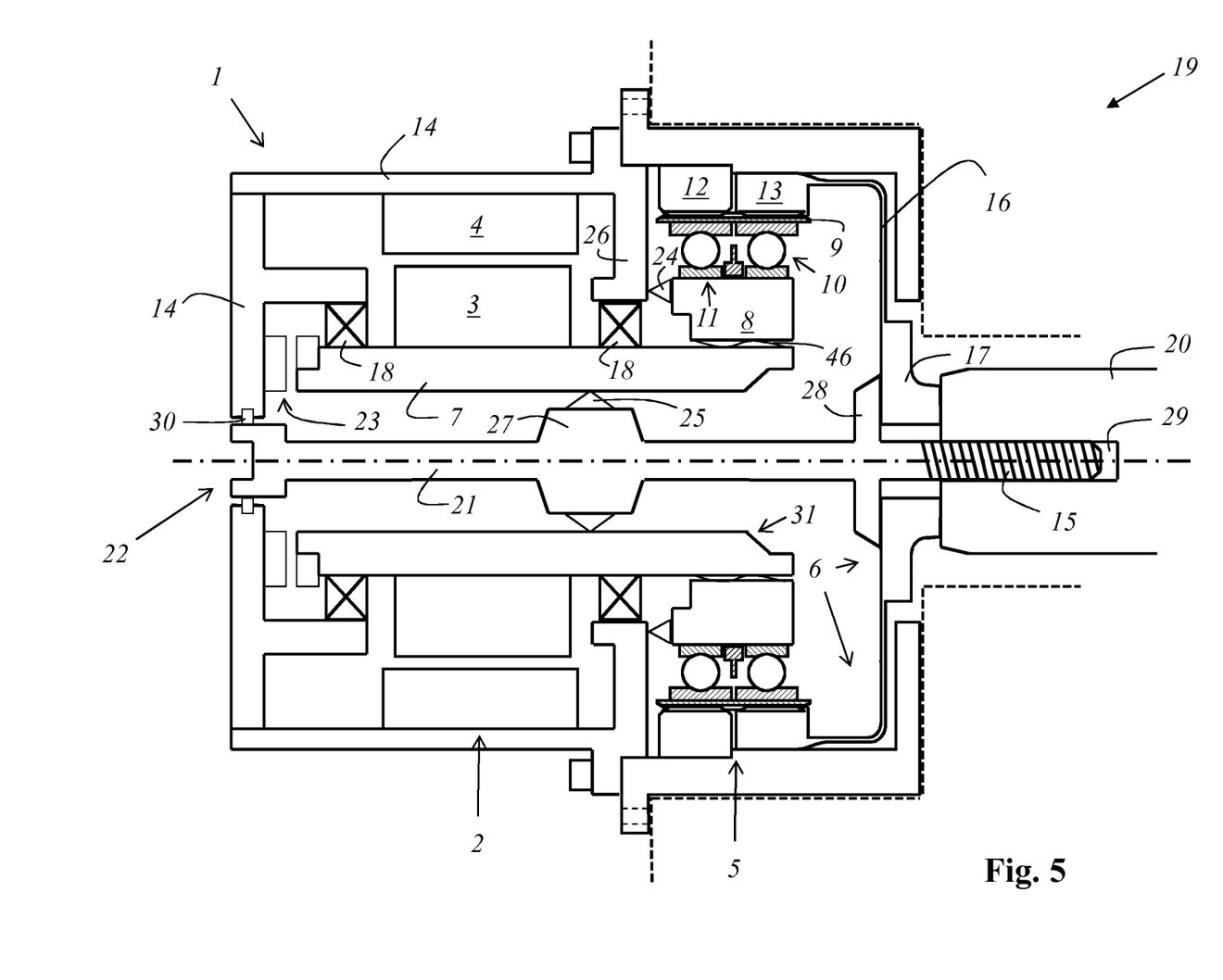
FIG. 5 shows a third exemplary embodiment of an actuator according to the invention.

FIG. 5 shows a third exemplary embodiment of an actuator 1 according to the invention. In this embodiment, the hollow shaft 7, as output component of the drive motor 2, and the wave generator 8 are formed as separately produced components, which are connected rotationally conjointly to one another. The wave generator 8 has a central recess into which the hollow shaft 7 is inserted in a frictionally engaging and rotationally conjoint manner by means of a clamping component 46. The clamping component 46 may be formed for example as a corrugated and/or elastic and/or cylindrically curved strip, in particular sheet-metal strip, and/or as a slotted ring and/or as a slotted cylindrical spring tube.

Figure 6:
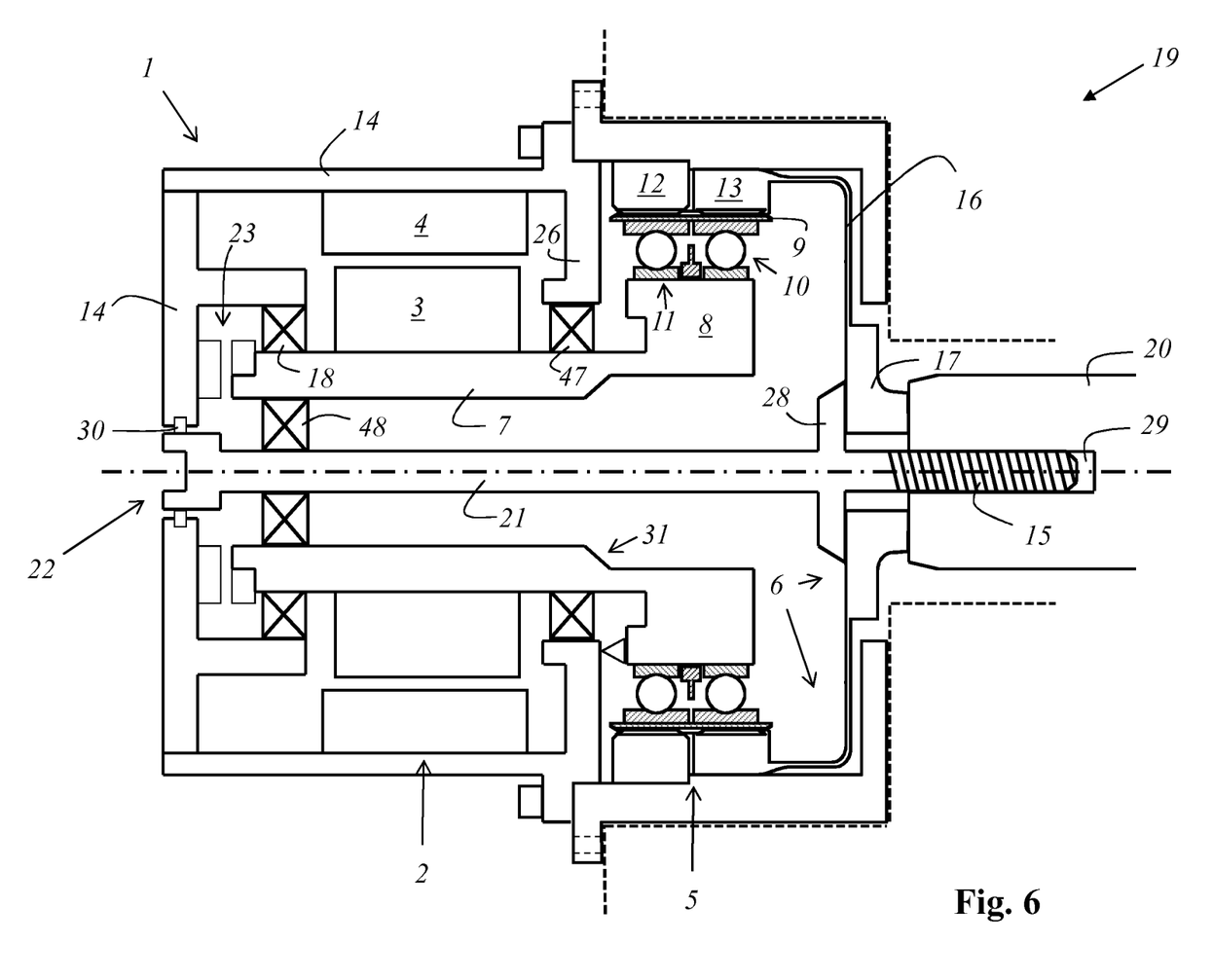
FIG. 6 shows a fourth exemplary embodiment of an actuator according to the invention.

FIG. 6 shows a fourth exemplary embodiment of an actuator 1 according to the invention, which is similar to the first exemplary embodiment shown in FIG. 1. By contrast to the exemplary embodiment illustrated in FIG. 1, the hollow shaft 7 is mounted rotatably by means of a first sealed bearing 47, which replaces the first seal 24 provided in the first exemplary embodiment in terms of the seal function. Furthermore, the fastening bolt 21 does not have the diameter thickening 27 that the fastening bolt 21 of the first exemplary embodiment has. Also, the second seal 25 is not provided. It is rather the case that the fastening bolt 21 is mounted, so as to be rotatable relative to the hollow shaft 7, by means of a second sealed bearing 48, such that the second sealed bearing 48 performs the seal function that is performed by the second seal 25 in the first exemplary embodiment.

LIST OF REFERENCE DESIGNATIONS

1 Actuator
2 Drive motor
3 Rotor
4 Stator
5 Gearing
6 Output element
7 Hollow shaft
8 Wave generator
9 Flex spline
10 Rolling bearing
11 Rolling bearing
12 Dynamic spline
13 Circular spline
14 Actuator housing
15 Thread
16 Output bell housing
17 Output shaft
18 Rolling bearing
19 System to be driven
20 Drive shaft
21 Fastening bolt
22 Head
23 Rotational speed sensor
24 First seal
25 Second seal
26 Partition
27 Diameter thickening
28 Collar
29 Threaded bore
30 Housing seal
31 Constriction
32 Sensor
33 Housing of the sensor 32
34 Encoder element
35 Detector element
36 Internal combustion engine
37 Adjustment shaft
38 Control device
39 Fastening channel
40 Washer
41 Sleeve
42 First seal
43 Second seal
44 Entrance opening
45 Cover
46 Clamping component
47 First sealed bearing
48 Second sealed bearing

What is claimed is:

1. An actuator comprising:
   a drive motor, and
   a gearing positioned downstream of the drive motor in terms of drive and arranged coaxially with respect to the drive motor, and which has an output element in the form of an output shaft,
   wherein the entire actuator can be coupled as a fully assembled and functional structural unit to a system to be driven by means of the actuator, which system is fully assembled and has a rotatably mounted drive shaft when the entire actuator is coupled to the fully assembled system,
   wherein a rotationally rigid connection of the output element to the drive shaft can be produced without parts of the actuator which are situated in the power flow from the drive motor to the output element or parts of the fully assembled system being dismounted for this purpose.

2. The actuator of claim 1, wherein the output element and the drive shaft are arranged coaxially in the rotationally rigid connection.

3. The actuator of claim 1, further comprising a fastening channel which runs through the gearing and the drive motor.

4. The actuator of claim 1, further comprising a fastening bolt which fastens the output element to the drive shaft of the system to be driven, wherein the fastening bolt is positioned through the gearing and the drive motor.

5. The actuator of claim 4, wherein the fastening bolt comprises a head and a collar axially spaced apart from the head, wherein the collar presses the output element against the drive shaft of the system to be driven.

6. The actuator of claim 4, wherein in an unmounted state of the actuator, the fastening bolt projects out of an actuator housing of the actuator, and wherein in a mounted state of the actuator to the system to be driven, the fastening bolt terminates flush with the actuator housing.

7. The actuator of claim 4, further comprising a sensor associated with the fastening bolt, wherein the sensor measures a rotational position or a number of rotations of the fastening bolt relative to a fixed component of the actuator.

8. The actuator of claim 4, further comprising a housing seal provided between an actuator housing of the actuator and the fastening bolt.

9. The actuator of claim 4, wherein the fastening bolt provides at least one seal surface and, in a region of the seal surface, has a diameter which is greater than or equal to a diameter of the head of the fastening bolt.

10. The actuator of claim 4, wherein the fastening bolt cannot be removed from the fully-assembled actuator without parts of the actuator being dismounted or destroyed for this purpose.

11. The actuator of claim 1, further comprising two spaces which are sealed off relative to one another, wherein the gearing is arranged in one of the two spaces, and the drive motor is arranged in the other of the two spaces.

12. The actuator of claim 11, wherein the spaces are sealed off relative to one another by at least one seal, wherein the at least one seal is chosen from one of: a non-contact seal, a dynamic seal, a rotary seal, a gap seal, a seal which utilizes a centrifugal effect for sealing purposes, and a labyrinth seal.

13. The actuator of claim 11, wherein the at least one seal bears against an inner side of a hollow output shaft of the drive motor.

14. The actuator of claim 1, wherein the gearing is formed as a strain wave gearing.

15. The actuator of claim 1, wherein an output component of the drive motor and a drive component of the gearing are separately produced components which are connected rotationally conjointly to one another.

16. An actuator system comprising:
   the actuator of claim 1; and a sensor which measures a rotational position or a number of rotations of a rotating component of the actuator relative to a fixed component of the actuator.

17. A drive system comprising:
an internal combustion engine; and
the actuator of claim 1, coupled to the internal combustion engine, wherein the actuator varies an expansion stroke or a compression ratio of the internal combustion engine.

18. The drive system of claim 17, wherein the internal combustion engine comprises an adjustment shaft, wherein the expansion stroke or the compression ratio of the internal combustion engine can be varied through variation of a rotational position of the adjustment shaft, and wherein the output element of the actuator is connected rotationally conjointly to the adjustment shaft.

19. The drive system of claim 18, further comprising a control device which determines a present setting of the expansion stroke or the compression ratio of the internal combustion engine exclusively via a sensor of the actuator which measures a rotational position or a number of rotations of a rotating component of the actuator relative to a fixed component of the actuator.

20. The drive system of claim 17, wherein the actuator comprises two spaces which are sealed off relative to one another, wherein one of the two spaces is connected to an oil supply system of the internal combustion engine.

21. A motor vehicle comprising the actuator of claim 1.

22. A fastening bolt for an actuator, the actuator comprising:

a drive motor; and
a gearing positioned downstream of the drive motor in terms of drive and arranged coaxially with respect to the drive motor, and which has an output element in the form of an output shaft;
wherein the entire actuator can be coupled as a fully assembled and functional structural unit to a system to be driven by means of the actuator, which system has a drive shaft;
wherein a rotationally rigid connection of the output element to the drive shaft can be produced without parts of the actuator being dismounted for this purpose, or without parts of the actuator which are situated in the power flow from the drive motor to the output element being dismounted for this purpose;
wherein the fastening bolt comprises:
  a head;
  a collar, axially spaced apart from the head, wherein the collar presses the output element against the drive shaft of the system to be driven;
  a sensor which measures a rotational position or a number of rotations of the fastening bolt relative to a fixed component of the actuator, wherein the sensor is coupled to the head of the fastening bolt; and
  at least one seal surface, wherein the diameter of the fastening bolt in the region of the at least one seal surface is greater than or equal to the diameter of the head.

\* \* \* \* \*